S. E. OWEN.
CORN PLANTER.

No. 181,199.

2 Sheets—Sheet 1.

Patented Aug. 15, 1876.

2 Sheets—Sheet 2.

S. E. OWEN.
CORN PLANTER.

No. 181,199. Patented Aug. 15, 1876.

Attest:
C. A. Snow.
J. W. Madigan

Inventor:
Silas E. Owen
by Louis Bagger & Co.
his Attys.

UNITED STATES PATENT OFFICE.

SILAS E. OWEN, OF NORWALK, OHIO.

IMPROVEMENT IN CORN-PLANTERS.

Specification forming part of Letters Patent No. 181,199, dated August 15, 1876; application filed March 25, 1876.

*To all whom it may concern:*

Be it known that I, SILAS E. OWEN, of Norwalk, in the county of Huron, and State of Ohio, have invented certain new and useful Improvements in Corn-Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
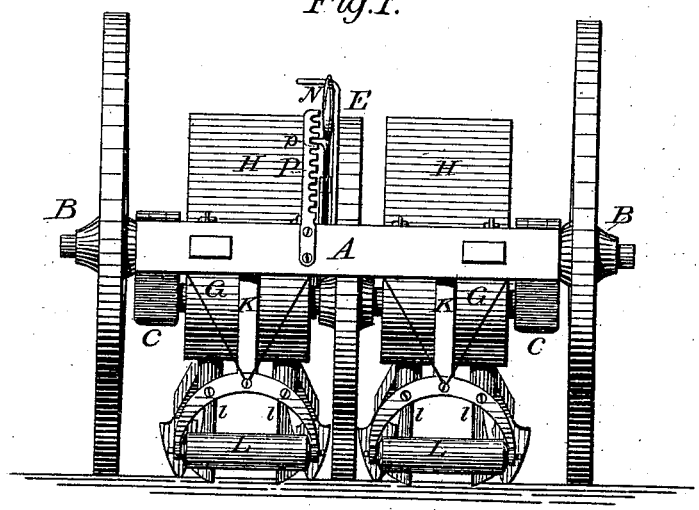
Figure 2:
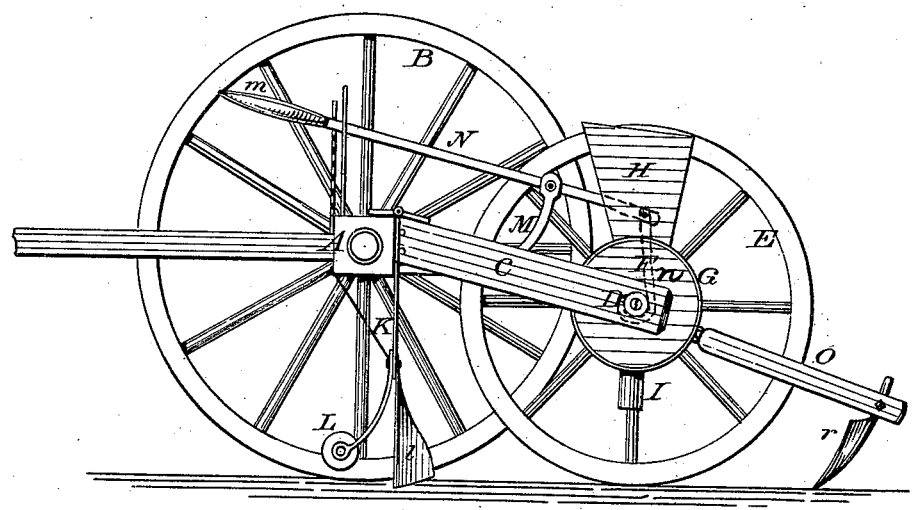
Figure 3:
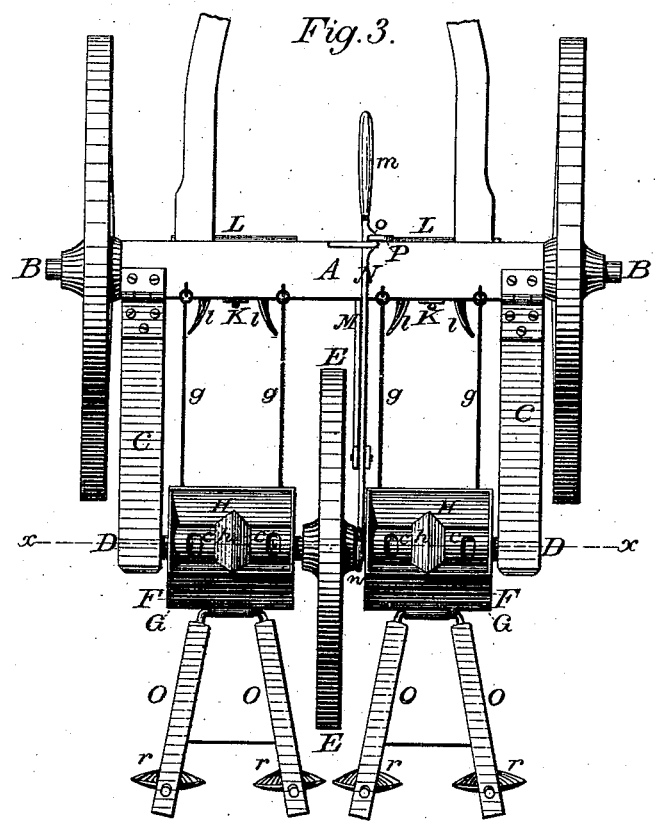
Figure 4:
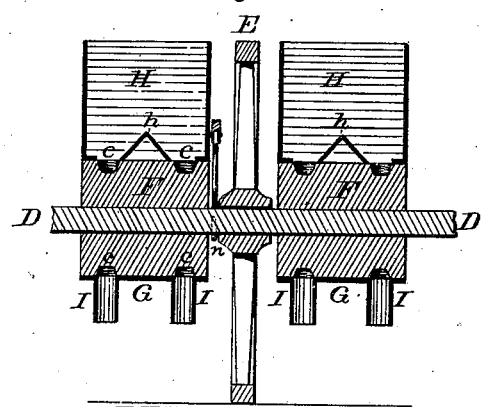

Figure 1 is a front elevation. Fig. 2 is a side elevation, one of the wheels being removed. Fig. 3 is a top plan, and Fig. 4 is a vertical section after the line indicated by $x$ $x$ in Fig. 3.

Similar letters of reference indicate corresponding parts in all the figures.

This invention relates to that class of machines used for planting corn; and it consists in the construction and combination of parts hereinafter shown and described.

In the drawing, A is the axle, which has the wheels B B. To the axle, near the wheels, are hinged two backward-projecting pieces, C C, the ends of which form bearings for the shaft D, upon which a wheel, E, is affixed. Shaft D also has the two solid cylinders F F affixed upon and revolving with it, each of these having at suitable intervals holes $c$ large enough to hold a kernel of corn. Cylinders F are incased by the outer cylinders G made of sheet metal or other suitable material, and of a size sufficient to allow cylinders F to revolve freely within them, they being prevented from turning themselves by being fastened to the axle (as shown in the drawing,) by means of rods $g$ $g$. Cylinders G have hoppers H partitioned by slanting walls $h$ for feeding the seed, and seed-tubes I for conveying it to the ground. Upon the rear side of the axle, in front of the cylinders, are two sliding pieces, K K, which, when set at any suitable height, may be firmly secured to the axle by any suitable means. Pieces K have at the bottom prongs, between which are pivoted the rollers L for flattening the soil before the drills are cut by the markers $l$, which are affixed to pieces K behind the rollers. M is a bracket projecting backwardly from the axle A. To it is pivoted a lever, N, having a pivoted hook, $n$, that catches around shaft D. Lever N has handle $m$ and projecting shoulder $o$, that may be made to engage with the teeth $p$ of upright P, which is affixed to front of axle A. By means of lever N it will be seen that the entire rear portion of the machine may be lifted, and wheel E thus thrown out of operation whenever desired. O O are rods pivoted to the rear of cylinders G, and having shovels $r$ $r$ for covering up the seed when sown.

From the foregoing description the operation of my improved corn-planter will be readily understood. The drills are cut by the markers $l$, the soil having been previously flattened by rollers L. As the machine advances the seed is dropped into the drills from tubes I, into which it is conveyed by the devices hereinbefore described, consisting of cylinders F and G. The distance between the hills may be regulated by the diameter of wheel E. The seed, when thus dropped, is finally covered up by shovels $r$. When corners are to be turned, or when for any other reason it becomes desirable, the seeding mechanism is thrown out of play by raising the rear end of the machine by means of lever N.

Having thus described my invention, I claim and desire to secure by Letters Patent of the United States—

1. The combination of axle A, having wheels B, with the swinging rods $g$ and stationary cylinders G, substantially as and for the purpose shown and specified.

2. The combination of the axle A, having wheels B, with the swinging beams C C and shaft D, the latter having wheel E arranged centrally between the rotating cylinders F F, substantially as and for the purpose shown and specified.

3. The combination of axle A, having toothed upright P, swinging beams C C, shaft D, carrying-cylinders F, and central wheel E, and lever N, having hook $n$ and pawl $p$, all combined to operate substantially as and for the purpose shown and specified.

In testimony that I claim the foregoing as my own I have hereto affixed my signature in presence of two witnesses.

SILAS E. OWEN.

Witnesses:
JOHN G. KING,
DELIA W. KING.